(12) United States Patent
Talwar et al.

(10) Patent No.: US 9,177,557 B2
(45) Date of Patent: Nov. 3, 2015

(54) SINGULAR VALUE DECOMPOSITION FOR IMPROVED VOICE RECOGNITION IN PRESENCE OF MULTI-TALKER BACKGROUND NOISE

(75) Inventors: Gaurav Talwar, Farmington Hills, MI (US); Rathinavelu Chengalvarayan, Naperville, IL (US)

(73) Assignee: GENERAL MOTORS LLC., Detroit, MI (US)

( * ) Notice: Subject to any disclaimer, the term of this patent is extended or adjusted under 35 U.S.C. 154(b) by 1381 days.

(21) Appl. No.: 12/498,811

(22) Filed: Jul. 7, 2009

(65) Prior Publication Data

US 2011/0010171 A1    Jan. 13, 2011

(51) Int. Cl.
G10L 17/02    (2013.01)
G10L 15/20    (2006.01)
G10L 21/0208  (2013.01)

(52) U.S. Cl.
CPC .......... *G10L 17/02* (2013.01); *G10L 15/20* (2013.01); *G10L 2021/02087* (2013.01)

(58) Field of Classification Search
CPC ....... G10L 25/48; G10L 15/07; G10L 15/065; G10L 15/08; G10L 17/04; G10L 25/90; G10L 15/20; G10L 17/02; G10L 2021/02087; G06K 9/6247; G06K 9/6278
USPC ...................... 704/249–250, 255
See application file for complete search history.

(56) References Cited

U.S. PATENT DOCUMENTS

| | | | |
|---|---|---|---|
| 6,873,951 B1 * | 3/2005 | Lin et al. | 704/251 |
| 2002/0095287 A1 * | 7/2002 | Botterweck | 704/250 |
| 2002/0120444 A1 * | 8/2002 | Botterweck | 704/236 |
| 2002/0143539 A1 * | 10/2002 | Botterweck | 704/255 |
| 2007/0112568 A1 * | 5/2007 | Fingscheidt et al. | 704/256.2 |

FOREIGN PATENT DOCUMENTS

| WO | WO 02/29785 | * 4/2002 |
|---|---|---|
| WO | WO 2007/131530 | * 11/2007 |

* cited by examiner

*Primary Examiner* — Angela A Armstrong
(74) *Attorney, Agent, or Firm* — Leydig, Voit & Mayer, Ltd.

(57) ABSTRACT

A system and method for providing speech recognition functionality offers improved accuracy and robustness in noisy environments having multiple speakers. The described technique includes receiving speech energy and converting the received speech energy to a digitized form. The digitized speech energy is decomposed into features that are then projected into a feature space having multiple speaker subspaces. The projected features fall either into one of the multiple speaker subspaces or outside of all speaker subspaces. A speech recognition operation is performed on a selected one of the multiple speaker subspaces to resolve the utterance to a command or data.

19 Claims, 4 Drawing Sheets

SINGULAR VALUE DECOMPOSITION FOR IMPROVED VOICE RECOGNITION IN PRESENCE OF MULTI-TALKER BACKGROUND NOISE

BACKGROUND OF THE INVENTION

As electronic assistive devices, e.g., for navigational and other purposes, become more prevalent in vehicles, there is a need to ensure that the driver's hands are not needed to operate such facilities, i.e., to ensure that the driver's ability to operate the vehicle is no impaired by tending to other tasks that require manual manipulation. To this end, many cars that include assistive devices also include a voice recognition facility for enabling the driver to operate the assistive devices via voice command However, such systems rely on accurate recognition of the user voice commands, and it is currently not always a straightforward technological matter to accurately recognize a user voice and command in the noise compromised environment of an automobile interior. In particular, not only is there a substantial amount of background noise in such environments, relative to other indoor environments, but there is also generally a higher concentration of speakers. For example, a driver may have a spouse and one or more children and/or guests in a car on certain occasions when it is desired to use voice command functionality, and if one or more of the passengers are speaking or making audible utterances such a laughing etc. during the voice recognition task, it is often difficult for the system to accurately perform voice recognition. This can be especially problematic when the background voice is a child's voice, due to the vast difference in basic frequencies involved.

BRIEF SUMMARY OF THE INVENTION

The invention provides improved voice recognition accuracy, especially in the presence of multi-talker background noise. This is especially true if the background voices are children's voices. In such circumstances, the invention provides an improved task completion rate and generally improved customer satisfaction.

In one aspect of the invention, a method of providing speech recognition functionality based on a spoken utterance in a noisy environment having multiple speakers is described. The method comprises receiving speech energy corresponding to the utterance, converting the received speech energy to an electronic form and digitizing the converted speech energy, decomposing the digitized speech energy into features, projecting the features into a feature space having multiple speaker subspaces, wherein the projected features fall either into one of the multiple speaker subspaces or outside of all speaker subspaces, and performing a speech recognition operation on a selected one of the multiple speaker subspaces to resolve the utterance to a command or data.

Another aspect of the invention includes a system for providing speech recognition functionality based on a spoken utterance. The system comprises a transducer for converting the utterance to an electrical speech signal, a digitizer for digitizing the electrical speech signal, a feature extraction module for extracting one or more features from the utterance and projecting the one or more features into respective one or more speaker subspaces, and a recognition engine for performing a speech recognition operation restricted to a single one of the respective one or more speaker subspaces to resolve the spoken utterance. These elements together provide the improved system robustness and accuracy.

Other objects and advantages of the invention will become apparent upon reading the following detailed description and upon reference to the drawings.

DETAILED DESCRIPTION OF THE INVENTION

Before explaining the details of the invention and the environment wherein the invention may be used, a brief overview is given to guide the reader. In overview, not intended to limit the claims in any way, the invention provides a system and method for providing speech recognition functionality offers improved accuracy and robustness in noisy environments having multiple speakers. The described technique includes receiving speech energy and converting the received speech energy to a digitized form. The digitized speech energy is decomposed into features that are then projected into a feature space having multiple speaker subspaces. The projected features fall either into one of the multiple speaker subspaces or outside of all speaker subspaces. A speech recognition operation is performed on a selected one of the multiple speaker subspaces to resolve the utterance to a command or data.

Figure 1:
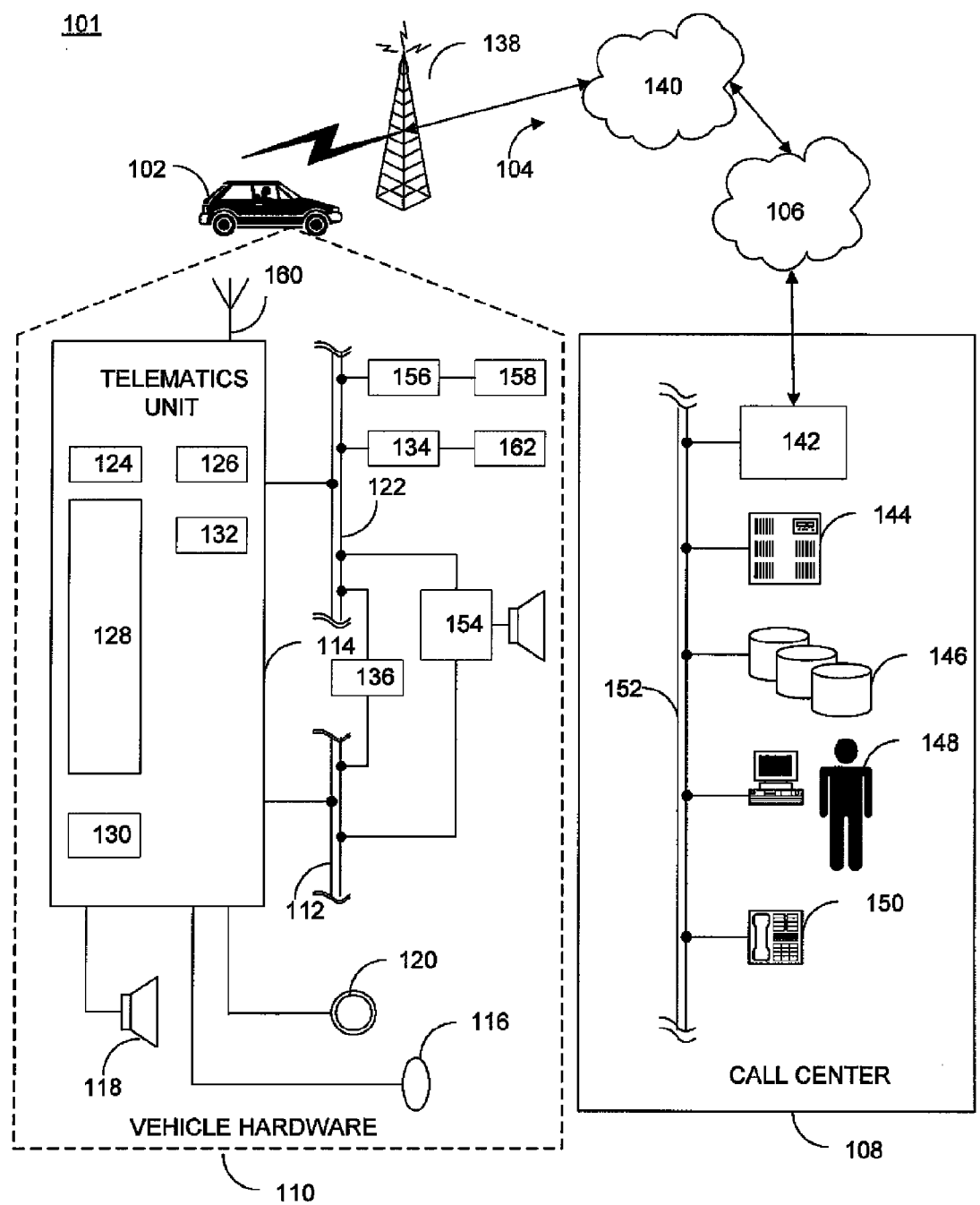
FIG. 1 is a schematic diagram of an operating environment for a mobile vehicle communication system.

An exemplary environment in which the invention may operate is described hereinafter. It will be appreciated that the described environment is an example, and does not imply any limitation regarding the use of other environments to practice the invention. With reference to FIG. 1 there is shown an example of a communication system 100 that may be used with the present method and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. The cellular chipset/component 124 and the wireless modem 126 may be called the network access device (NAD) 180 of the telematics unit.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include powertrain control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 180. As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 100 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

Figure 2:
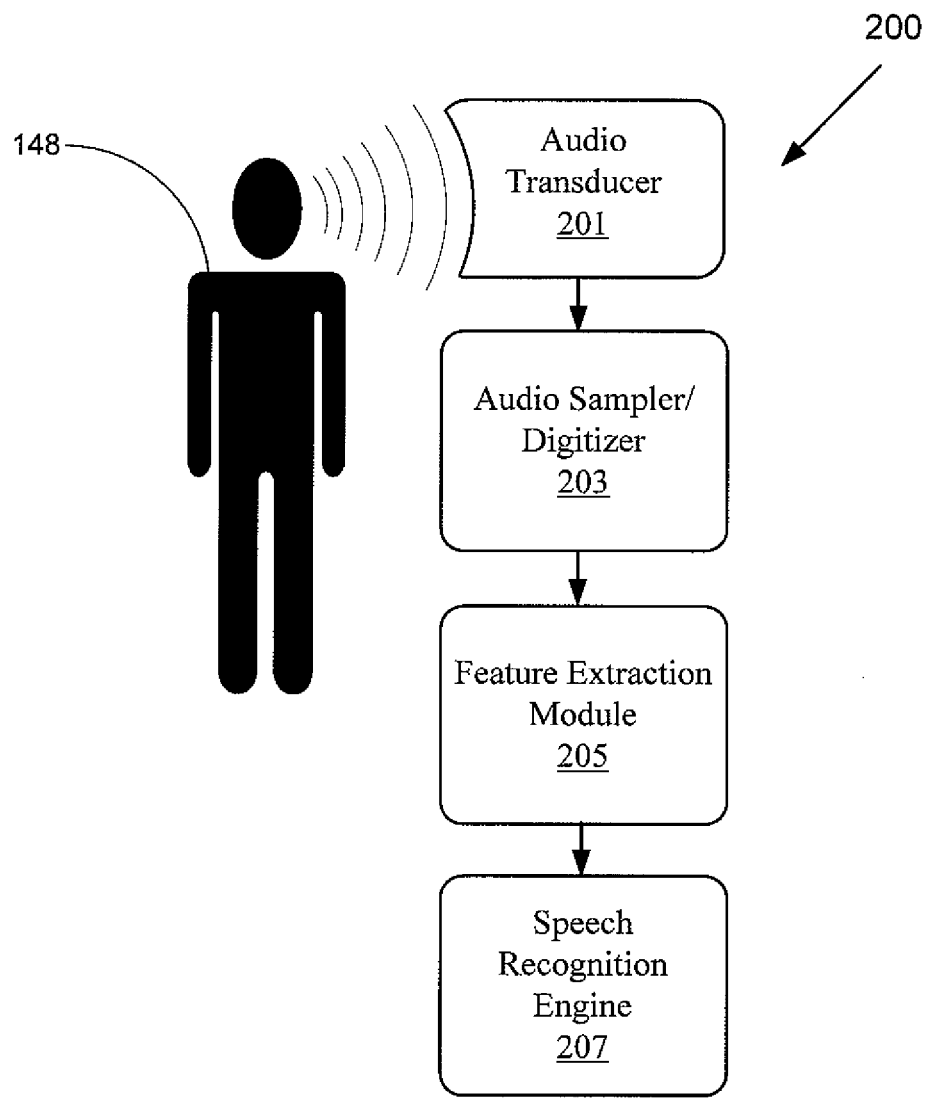
FIG. 2 is a more detailed schematic diagram of a assistive system within which the invention may be implemented.

As noted above, microphone 116 provides the driver or other vehicle occupant with a means for inputting verbal or other auditory commands, and may be equipped with an embedded voice processing unit utilizing a human/machine interface (HMI) technology. FIG. 2 is a more detailed schematic diagram of a voice processing unit usable in keeping with the invention. As will be appreciated by those of skill in the art, the illustrated architecture 200 may be, and often will be, a component of a larger system, such as a telematics unit or otherwise, and/or may be segmented as shown or may include more or fewer elements combined or separated differently than as is shown.

The illustrated architecture 200 includes an audio transducer 201, e.g., a mic such as microphone 116. The audio transducer 201 operates as a transducer to convert audible speech energy to an electronic representation thereof. For example, the audio transducer 201 may convert the speech energy to an analog voltage or analog current representation or form.

The output of the audio transducer 201 is digitized by audio sampler/digitizer 203 to create a digital representation of the speech pattern. For example, the audio sampler/digitizer 203 may create and output a pulse width modulated (PWM) representation of the speech pattern.

After the speech has been digitized by the audio sampler/digitizer 203, the resultant digital waveform is decomposed by the feature extraction module 205. This module 203 identifies and extracts certain features as a function of frequency or other parameters. Typically, a feature that is relevant to speech recognition will occur over many frames of digital voice data. For example, if the user may have uttered one of the words "directions," "detour," or "destination," then it is not sufficient to simply recognize a "d" at the outset of the utterance. Thus, the feature extraction module 205 may operate by analyzing a signal corresponding to a moving speech window as opposed to an isolated sequence of speech samples.

After the speech features of interest are extracted at the feature extraction module 205, the resultant feature set is forwarded to a recognition engine 207 for identification of commands or data associated with identified features. For example, if the user uttered "go home," then the feature extraction module 205 will identify this string of sounds, and the recognition engine 207 will match them to the phrase "go home." After the recognition engine 207 recognizes the decomposed utterance, it delegates or executes appropriate actions, such as instructing the navigation module to present directions to the user's home from the user's current position.

In accordance with one feature of the invention, a further decomposition step is applied to decompose the speech after the feature extraction stage before it is fed to the engine to make the recognition decision. As noted above, the features that are used in speech recognition are generally collected over multiple time frames. This set of features includes speaker-independent as well as speaker-dependent information. In this aspect of the invention, the driver is presented with an option to train the speech recognition system for multiple primary speakers, e.g., the primary driver (S1) and his/her spouse (S2).

Figure 3:
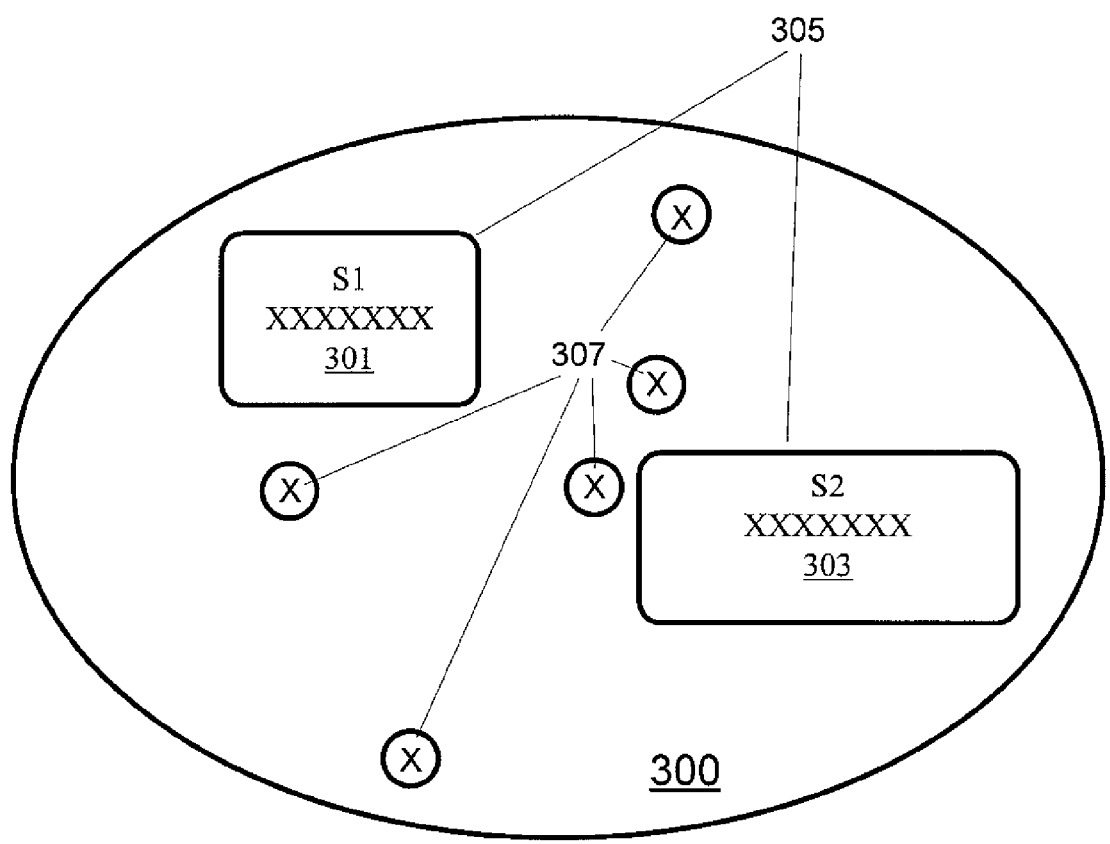
FIG. 3 is a data diagram illustrating a decomposition of voice data into speaker dependent subgroups in keeping with the invention.

This use of multiple user subspaces is shown schematically in FIG. 3. In particular, as can be seen, each speaker S1, S2 is associated with a particular subspace 305 in the feature coordinate space 300. In a given decomposition, each subspace 305 has associated therewith speaker-specific normalized data projected by eigenpairs. In this manner the input speech energy can be divided by contribution from each speaker S1, S2.

In greater detail, the feature data can be decomposed into speaker dependent and speaker independent portions through a SVD (Singular Value Decomposition) matrix transformation. That is, if M is the matrix of features, then by using SVD transformation it will be decomposed into following parts:

$$SVD(M)=USV$$

The entity US denotes the speaker independent speech data while the matrix V provides information about the speaker subspaces in the multidimensional speaker space. The projections of speaker independent speech data i.e., US, can be further projected into corresponding speaker subspaces lined out by matrix V. As a result, each speaker subspace will contain only speaker related phoneme information and thus the subspaces would contain only speaker specific normalized data. The speech data is projected into speaker subspaces by using their known eigenvalues and eigenvectors (orthonormal bases).

In addition to the data falling within one or the other of the speaker subspaces 301, 303, there may also be data resolvable to neither speaker. In the illustrated example, these "outliers" are labeled with reference numeral 307 collectively. By eliminating the outlier data 307 and using just the speaker specific normalized data, the process can reduce the error rate and increase recognition robustness.

Figure 4:
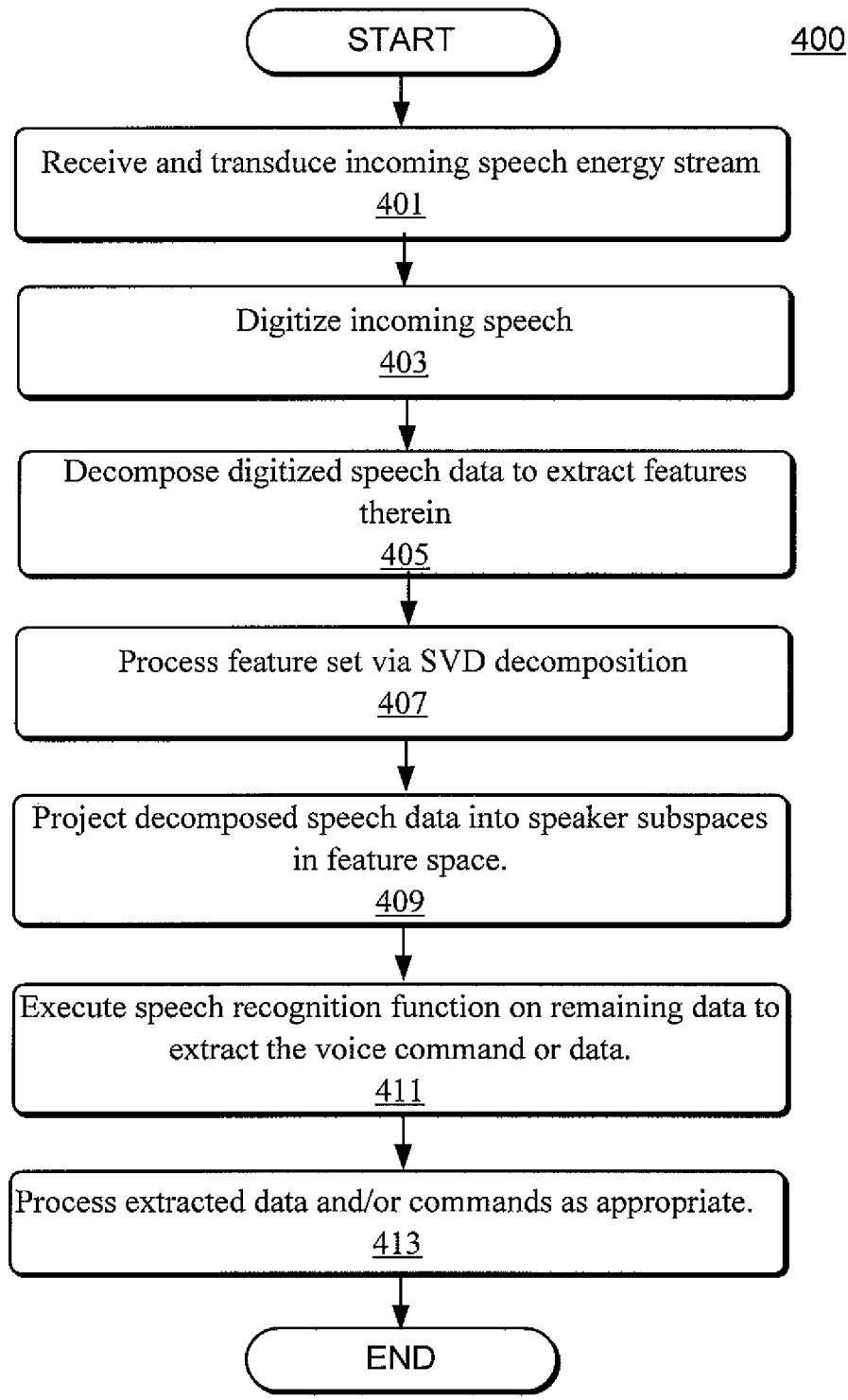
FIG. 4 is a flowchart illustrating a process of voice data decomposition and speech recognition in keeping with the invention.

FIG. 4 is a flow chart illustrating a process 400 of performing a speech recognition task in accordance with the invention, with reference to the architecture 200 of FIG. 2 and the data types and classifications of FIG. 3. Referring now to the process 400 of performing speech recognition with respect to a given stream of speech energy, the process begins at stage 401 by receiving an incoming speech energy stream. Such receipt is by way, e.g., of the transducer or other similar structure. Once the speech energy has been received and converted to an electrical signal, the resultant electrical signal is digitized at stage 403, e.g., by the audio sampler/digitizer 203.

The digitized speech may now be analyzed and decomposed at stage 405 to extract any features in the speech signal. The resultant feature set describes essentially the entirety of the incoming stream without distinguishing between various users or between speech and background noise, e.g., mechanical or wind noise. The feature set produced at stage 405 is processed via SVD decomposition in stage 407. This process has the effect of producing speaker dependent data and speaker independent data. The decomposed data is projected into speaker subspaces at stage 409.

At stage 411 of the process 400, all non-speaker data and other speaker data is removed, so that only speech data associated with the speaker subspace of the driver or other primary user remains. At this point the speech recognition engine 207 executes a speech recognition function on the remaining data at stage 411 to extract the voice command or data conveyed to the system by the user. At stage 413, the extracted data and/or commands are processed as appropriate. For example, in the case of a command, the command is executed. In the case of data, the data is either stored or otherwise processed as appropriate.

It will be appreciated that the foregoing methods and implementations for speech recognition are merely examples of the inventive principles, and that these illustrate only preferred techniques. It is contemplated that other implementations of the invention may differ in detail from foregoing examples. All references to the invention are intended to reference the particular example of the invention being discussed at that point and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of providing speech recognition functionality for an utterance spoken in a noisy environment having multiple human speakers, the method comprising:
  receiving speech energy corresponding to the utterance, the received speech energy comprising contributions from multiple human speakers;
  converting the received speech energy to an electronic form;
  digitizing the electronic form of the received speech energy to render a digitization of the received speech energy;
  decomposing the digitization of the received speech energy to produce feature data representative of features in the digitization of the received speech energy, wherein the feature data does not distinguish between different speakers and between speech and background noise;
  processing the feature data to produce speaker dependent feature data and speaker independent feature data;
  projecting only the speaker independent feature data into a feature space, the feature space having multiple human speaker subspaces for multiple human speakers, wherein each one of the multiple human speakers is associated with a distinct one of the multiple human speaker subspaces and wherein the features of the speaker independent feature data project either into one of the multiple human speaker subspaces or outside of all human speaker subspaces;
  identifying the speaker independent feature data associated with a speaker subspace associated with a primary human speaker; and
  performing a speech recognition operation on speaker independent feature data associated with the speaker subspace associated with the primary human speaker to resolve the utterance to a command or data,
  wherein the speaker independent feature data includes contributions from at least two speakers, and
  wherein performing a speech recognition operation on the feature data associated with the speaker subspace associated with the primary human speaker to resolve the utterance to a command or data comprises removing all feature data not associated with the speaker subspace associated with the primary human speaker.

2. The method of providing speech recognition functionality according to claim 1, wherein the step of converting the received speech energy to an electronic form comprises transducing audible speech energy to an analog electronic signal.

3. The method of providing speech recognition functionality according to claim 1, wherein the step of processing the feature data to produce speaker dependent feature data and speaker independent feature data includes applying a singular value decomposition matrix transformation to the data.

4. The method of providing speech recognition functionality according to claim 1, wherein the utterance is a command, and wherein performing a speech recognition operation on the speaker independent feature data associated with the speaker subspace associated with the primary human speaker to resolve the utterance to a command or data comprises resolving the utterance to a command, and wherein the method further comprises the subsequent step of causing the command to be executed.

5. The method of providing speech recognition functionality according to claim 1, wherein each human speaker subspace contains only speaker related phoneme information.

6. The method of providing speech recognition functionality according to claim 5, wherein the speaker related phoneme information is speaker specific normalized data.

7. The method of providing speech recognition functionality according to claim 1, wherein the step of projecting only the speaker independent feature data into the feature space comprises projecting the speaker independent feature data into the multiple human speaker subspaces by using eigenvalues and orthonormal bases.

8. A method of providing speech recognition functionality for an utterance spoken in a noisy environment having multiple human speakers, the method comprising:
  extracting feature data from the utterance, wherein the feature data comprises one or more features;
  processing the feature data to produce speaker dependent feature data and speaker independent feature data;
  projecting only the speaker independent data into a feature space, the feature space having multiple human speaker subspaces for multiple human speakers, wherein each one of the multiple human speakers is associated with a distinct one of the multiple human speaker subspaces;

identifying speaker independent feature data associated with a speaker subspace associated with a primary human speaker; and performing a speech recognition operation restricted to a single one of the multiple human speaker subspaces, wherein the speaker independent feature data includes contributions from at least two speakers, and wherein performing a speech recognition operation restricted to a single one of the multiple human speaker subspaces comprises removing all feature data not associated with the speaker subspace associated with the primary human speaker.

9. The method of providing speech recognition functionality based on a spoken utterance according to claim 8, wherein the utterance comprises speech energy and wherein extracting feature data from the utterance comprises:

receiving the speech energy, converting the received speech energy to an electronic form, digitizing the converted speech energy, and decomposing the digitized speech energy into features.

10. The method of claim 8, further comprising:

identifying speaker independent feature data associated with a second speaker subspace associated with a second human speaker; and performing a second speech recognition operation restricted to a second one of the multiple human speaker subspaces.

11. The method of providing speech recognition functionality based on a spoken utterance according to claim 10, further comprising dividing the input speech energy by contribution from each of the at least two speakers.

12. The method of providing speech recognition functionality based on a spoken utterance according to claim 8, wherein the step of projecting the speaker independent feature data into a feature space comprises projecting the speaker independent feature data into the multiple human speaker subspaces by using eigenvalues and orthonormal bases.

13. The method of providing speech recognition functionality based on a spoken utterance according to claim 8, wherein processing the feature data to produce speaker dependent feature data and speaker independent feature data includes applying a singular value decomposition matrix transformation to the feature data.

14. The method of providing speech recognition functionality based on a spoken utterance according to claim 8, wherein the step of performing a speech recognition operation restricted to a single one of the multiple human speaker subspaces comprises discarding all data not in the selected one of the multiple speaker subspaces.

15. The method of providing speech recognition functionality based on a spoken utterance according to claim 8, wherein the utterance is a command, and wherein performing a speech recognition operation restricted to a single one of the respective one or more speaker subspaces comprises resolving the utterance to a command, and wherein the method further comprises the subsequent step of causing the command to be executed.

16. The method of providing speech recognition functionality based on a spoken utterance according to claim 8, wherein each of the multiple human speaker subspaces contains only speaker related phoneme information.

17. The method of providing speech recognition functionality based on a spoken utterance according to claim 16, wherein the speaker related phoneme information is speaker specific normalized data.

18. A system for providing speech recognition functionality for an utterance spoken in a noisy environment having multiple human speakers, the system comprising:

a transducer for converting the utterance to an electrical speech signal;

a digitizer for digitizing the electrical speech signal;

a feature extraction module for extracting one or more features from the digitized electrical speech signal to produce feature data;

a processing module for processing the feature data to produce speaker dependent feature data and speaker independent feature data;

a projection module for projecting the speaker independent feature data into a feature space, the feature space having multiple human speaker subspaces for multiple human speakers, wherein each one of the multiple human speakers is associated with a distinct one of the multiple human speaker subspaces;

an identification engine configured to identify speaker independent feature data associated with a speaker subspace associated with a primary human speaker; and a recognition engine is configured to perform a speech recognition operation restricted to a single one of the multiple human speaker subspaces to resolve the spoken utterance, wherein the speaker independent feature data includes contributions from at least two speakers, and wherein performing a speech recognition operation restricted to a single one of the multiple human speaker subspaces to resolve the spoken utterance comprises removing all feature data not associated with the speaker subspace associated with the primary human speaker.

19. The system for providing speech recognition functionality according to claim 18, wherein the recognition engine is further adapted to cause a command to be executed if the utterance is resolved to the command.

* * * * *